July 9, 1963  R. E. MOORE  3,096,682
REVERSIBLE SHUTTER DRIVE AND ACCESSIBLY MOUNTED
MECHANISMS IN A MOTION PICTURE PROJECTOR
Filed May 15, 1959 7 Sheets-Sheet 5
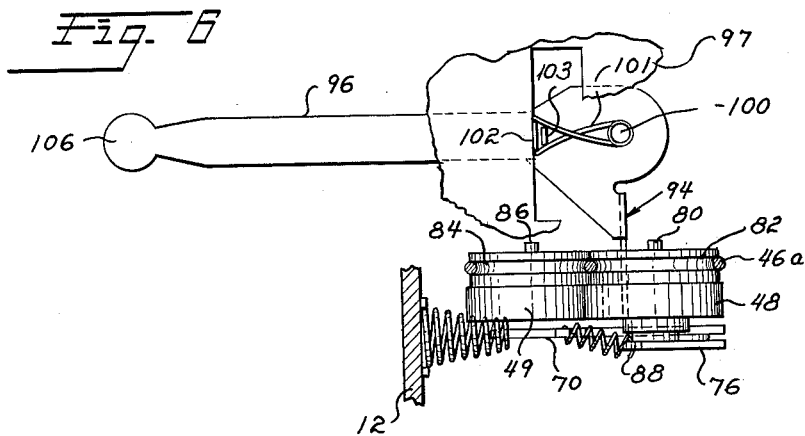
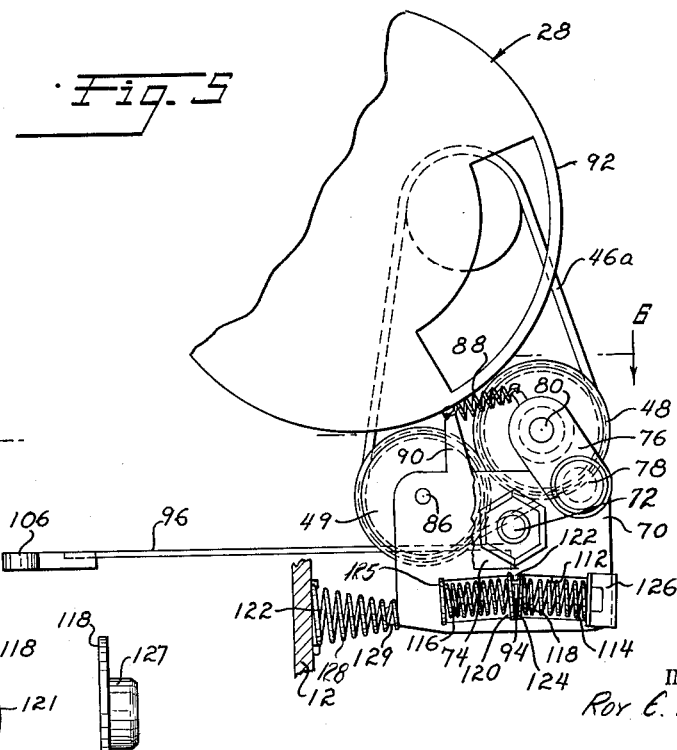
INVENTOR
Roy E. Moore
BY Strauch, Nolan & Neale
ATTORNEYS

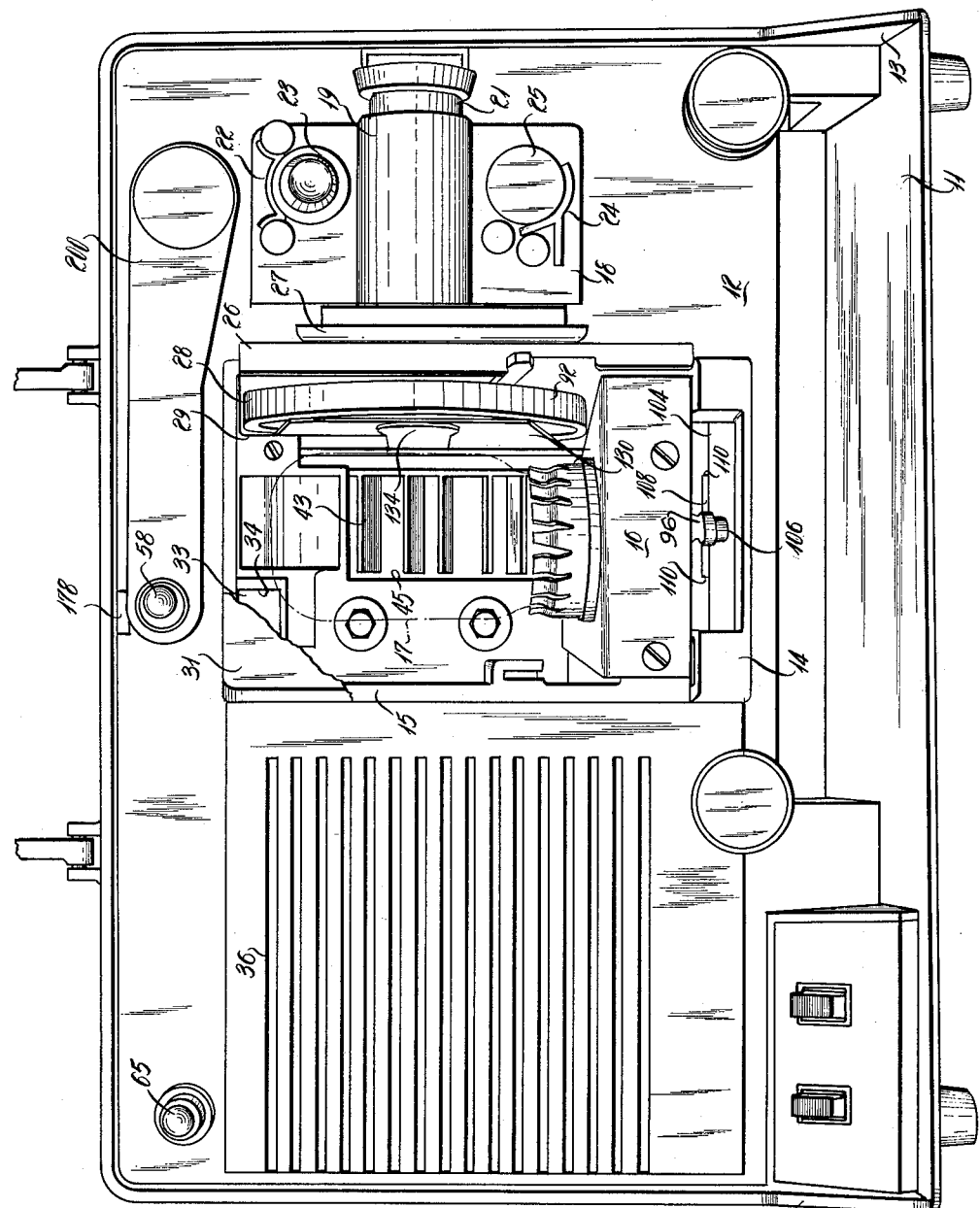

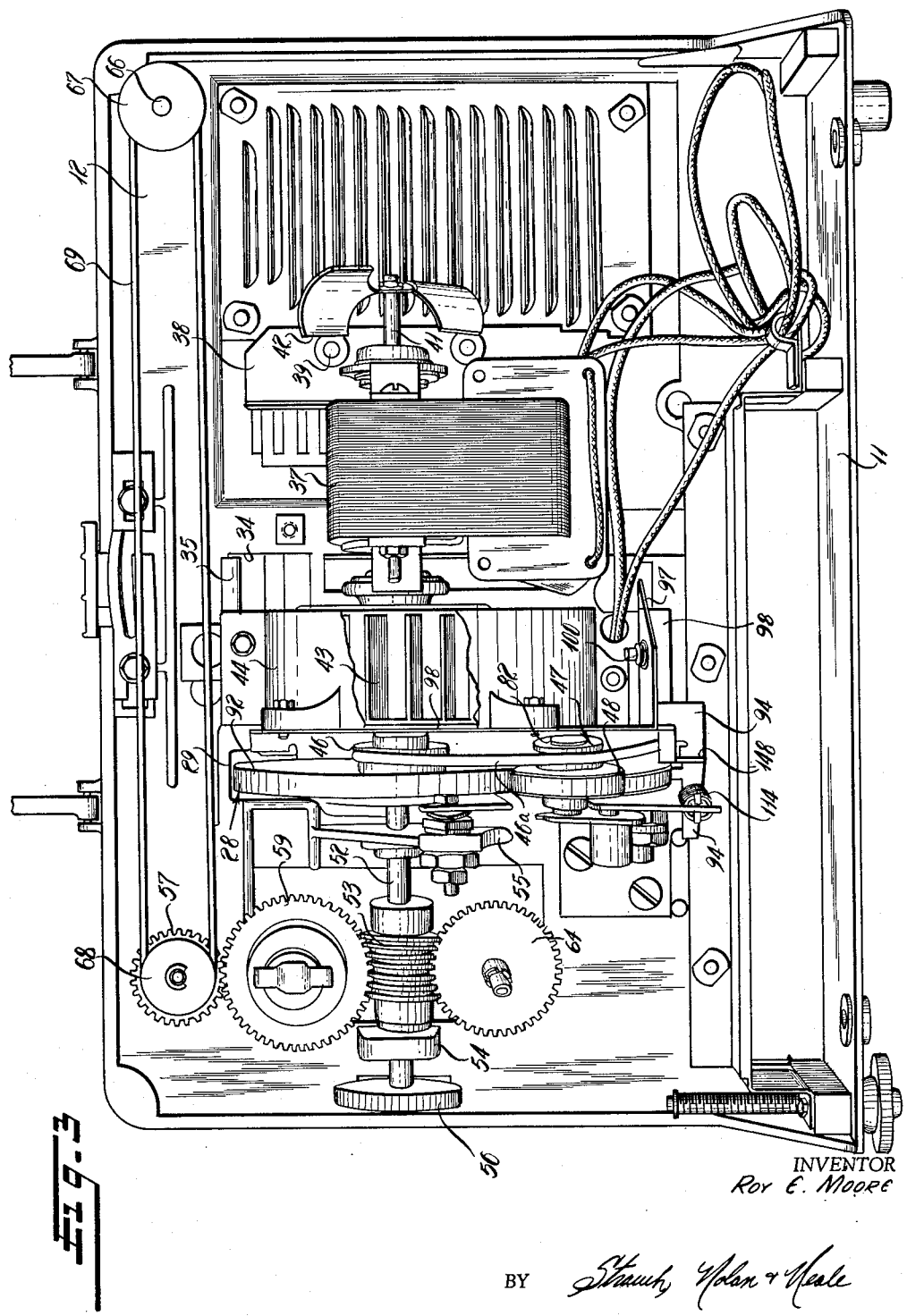

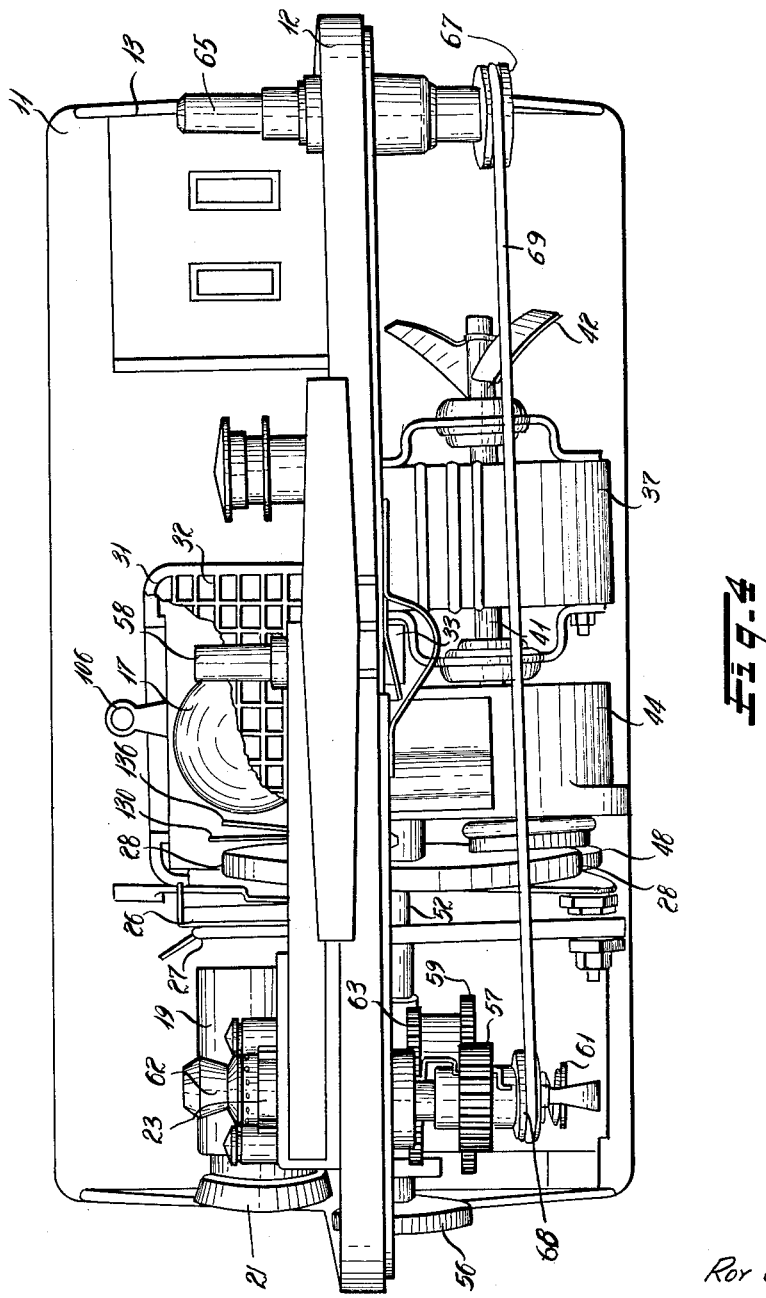

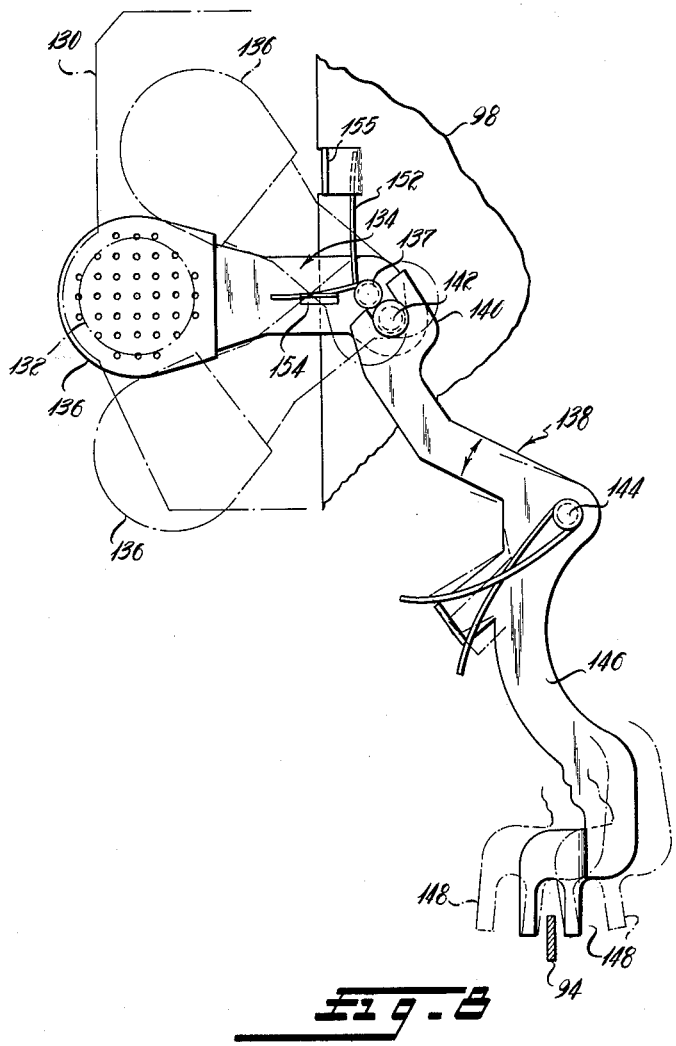

July 9, 1963  R. E. MOORE  3,096,682
REVERSIBLE SHUTTER DRIVE AND ACCESSIBLY MOUNTED
MECHANISMS IN A MOTION PICTURE PROJECTOR
Filed May 15, 1959  7 Sheets-Sheet 7
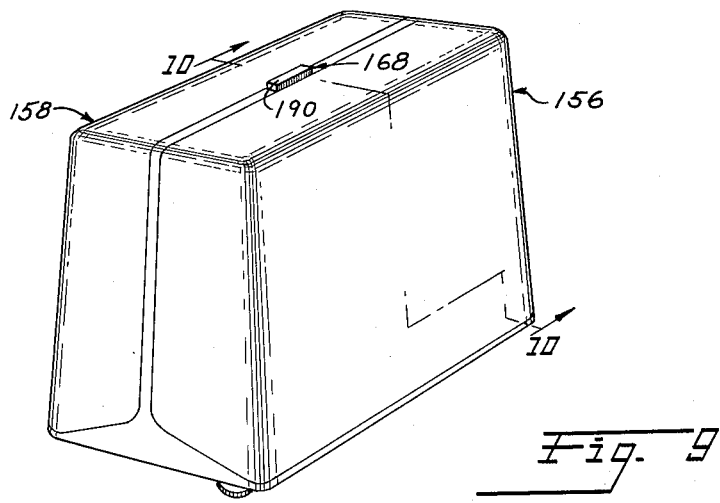
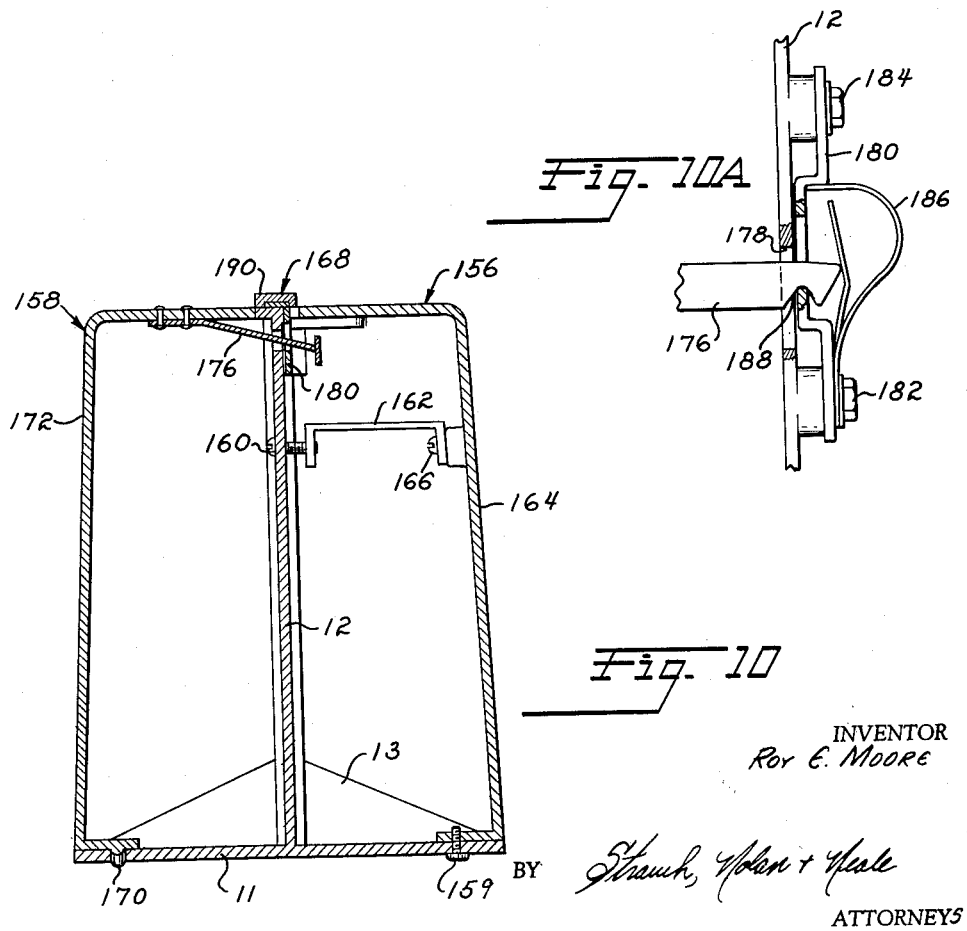
INVENTOR
Roy E. Moore
ATTORNEYS

United States Patent Office 3,096,682
Patented July 9, 1963

3,096,682
REVERSIBLE SHUTTER DRIVE AND ACCESSIBLY MOUNTED MECHANISMS IN A MOTION PICTURE PROJECTOR
Roy E. Moore, Ann Arbor, Mich., assignor, by mesne assignments, to Argus Incorporated, a corporation of Delaware
Filed May 15, 1959, Ser. No. 813,453
4 Claims. (Cl. 88—17)

This invention relates to motion picture projectors and particularly to a novel compact arrangement of parts therefor.

The invention contemplates an efficiently organized mechanically simple, easily assembled and repaired, combination of motion picture projector elements wherein all drive parts are safely enclosed during operation of the projector but are readily exposed for service. The single motor is mounted to efficiently actuate the film moving parts and the cooling system, and the assembly is rigid and in balanced relation on an upright base plate that has a maximum of cast mounting formations.

It is the major object of the invention to provide a novel motion picture projector having all parts arranged in compact but accessible location on an upright frame.

A further object of the invention is to provide a motion picture projector that has a novel cooling system arrangement.

It is another object of the invention to provide a novel motion picture projector assembly wherein the film handling and drive elements are on opposite sides of an upright rigid plate.

Further objects of the invention will appear in connection with the appended claims and the annexed drawings wherein:

FIGURE 2 is a side elevation showing the lamp housing and film moving elements;

FIGURE 3 is an opposite side elevation showing the drive mechanism and cooling system;

FIGURE 4 is a top plan view of the projector of FIGURE 1;

FIGURE 5 is an enlarged fragmentary end elevation of the power transmission assembly for driving the projector shutter;

FIGURE 6 is a section substantially along line 6—6 of FIGURE 5;

FIGURE 7 is an enlarged end elevation of the compression spring end plate for the lost motion compression springs of the shutter transmission drive assembly illustrated in FIGURE 5;

FIGURE 7a is an enlarged side elevation of the end plate illustrated in FIGURE 7;

FIGURE 8 is an enlarged fragmentary elevation partly in section of the film fire screen assembly and the interlock with the shutter transmission drive assembly;

FIGURE 9 is a perspective view of the projector of FIGURE 1 with the covers in assembled position;

FIGURE 10 is a section substantially along the line 10—10 of FIGURE 9 with the film handling and drive mechanisms removed;

FIGURE 10a is an enlarged fragmentary top elevation partly in section of the cover latch mechanism.

Figure 1:
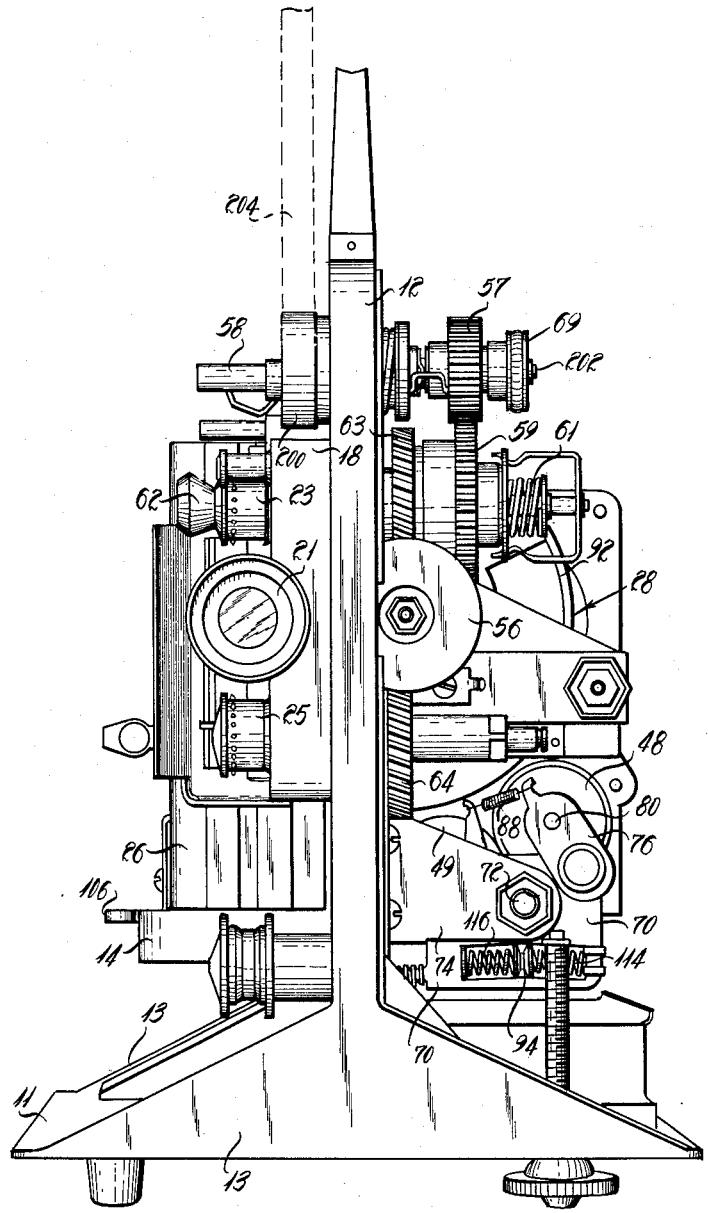
FIGURE 1 is an end elevation of the projector with both covers removed.

Referring now to FIGURES 1, 2 and 4, wherein the construction embodying the principles of the present invention are shown, the projector comprises a base 11 midway of which rises a rigid plate 12, and reinforcing webs 13 between the base and plate at both ends of the plate. The base 11, plate 12 and flanges 13 comprise a cast assembly.

Also cast rigid with plate 12 and projecting from one side are the lower wall 14 and rear side wall 15 of a lamp housing containing a socket assembly 16 with a projection lamp 17. A generally rectangular boss 18 is also cast integral with that side of the housing and this is intermediately formed with a hollow longitudinal boss 19 in which the objective lens tube 21 is slidably mounted. Cast integral with boss 18 is an arcuate film shoe 22 concentric with the upper film sprocket 23. A similar shoe 24 is cast concentric with the lower film sprocket 25. These film shoes 22 and 24 serve to control the film threading path in a conventional manner.

The forward end of the lamp housing is closed by a film track assembly 26 carrying a pressure pad 27, with projection apertures in line with the optical axis. The details of the film track assembly 26 are fully disclosed and claimed in the separate copending application of Roy E. Moore Serial No. 807,179 filed April 17, 1959, entitled "Film Gate," Patent No. 3,014,404, issued December 26, 1961. A sector type shutter 28 extends through plate opening 29 into the light path. The lamp housing is closed by a side cover 31 that clips removably into wall 14 and has a top ventilation grating 32 (FIGURE 4) and an inwardly projecting lug 33 that extends through plate aperture 34 to engage with a holding spring 35 in the other side of the plate.

Rearwardly of the lamp housing the plate 12 is provided with a cast ventilation grating indicated at 36.

Referring now to FIGURES 1, 3 and 4, at the other side of the projector an electric motor 37 has a support 38 secured to plate 12 as by bolts 39. The motor shaft 41 carries a fan 42 at its rear end and a fan 43 at its forward end. Fan 43 operates in a shroud 44 which opens into the lamp housing through the plate aperture 45 (FIGURE 2) directly opposite the lamp 17.

A pulley 46 is mounted on shaft 41 and is drive connected by belt 46a to a transmission assembly 47 incorporating oppositely driven friction wheels 48 and 49 swingably mounted, as will hereinafter be described, so that one or the other of wheels 48 or 49 selectively engages with the rim of shutter 28 to rotate the shutter.

Shutter 28 is fixed on a horizontal shaft 52 that is laterally spaced inwardly of and parallel to shaft 41. Shaft 52 is provided with a worm gear section 53 adapted to drive the upper and lower film sprockets, and is journalled in cast lugs 54 and 55 on the side of plate 12. A knurled manual operating knob 56 is provided on shaft 52. A gear 57 adapted to drive the supply reel spindle 58 (FIGURE 2) during rewind is meshed with a gear 59 adapted to be clutched to the upper sprocket drive under control of clutch 61 and clutch selector rod 62. The details of the sprocket and spindle drive are disclosed and claimed in a separate copending application of William A. Grove, Serial No. 807,099, filed April 17, 1959, and entitled "Projector," Patent No. 3,061,219 issued October 30, 1962. It will be noted here that the sprocket drive gears 63 and 64 are meshed directly with worm 53.

By this structure and in accordance with said copending Grove application, it will be appreciated that when shutter 28 is driven in a selected forward direction in a manner as will hereinafter be described, the shaft 52 is rotated to drive the take-up reel spindle 65.

The take-up reel spindle 65 is journalled in plate 12 and is provided with a coaxial stub shaft 66 which extends outwardly beyond the right-hand side of plate 12 as viewed from FIGURE 1 and carries a pulley 67. Pulley 67 is drivingly connected to a pulley 68 by a coil spring belt 69. Pulley 68 as described in said copending Grove application is connected to gear 57 by rotation of the shutter 28 in a selected reverse direction.

The clutch 61, as disclosed in said copending Grove application, has its input connected to the main drive mechanism of the projector and its output automatically connected to drive one or the other of the take-up or supply reel spindles 65 or 58 depending on the direction of rotation of the shutter 28 and consequently the shaft 52.

A suitable film advance claw (not shown) is drivingly connected to the central hub of shutter 28 which is provided with a suitable camming surface (not shown) to impart the film advancing motion to the claw. Thus, by rotation of the shutter, the film advancing claw is set in motion and the supply wheel spindle 58 is driven.

Referring now to FIGURES 5 and 6, the transmission mechanism 47 comprises a shift plate 70 swingable on a pivot 72 carried by a bracket 74 secured to plate 12 and projecting outwardly therefrom. An idler arm 76 is pivoted on plate 70 at 78 and is provided with a stud 80 affixed thereto and extending rearwardly substantially parallel to the axis of motor shaft 41. A grooved pulley 82 shown also in FIGURE 3 driven by belt 46a is journalled on the stud 80 near the rearwardly extending end thereof. The drive wheel 48 is mounted for free rotation on the stud 80 between the pulley 82 and plate 70. Drive wheel 49 and a grooved pulley 84 driven by belt 46a are secured together and are coaxially journalled on a stud 86 which is affixed to plate 70 and extends rearwardly of plate 70 in substantially spaced parallel relationship to the axis of stud 80.

Wheels 48 and 49 are rubber tired and are pulled into peripheral contact with each other by a spring 88 extending between an upwardly extending notched arm 90 integral with plate 70 and the idler arm 76. The belt 46a passes around pulleys 46, 82 and 84 so that rotation of the motor shaft 41 rotates both the idler and driven pulleys 82 and 84.

By this structure, it will be appreciated that when wheel 49 is driven from pulley 84, wheel 48, which is in continuous contact with wheel 49, is driven in the opposite direction. Thus when plate 70 is selectively swung about its pivotal axis 72, either one of the drive wheels 48 or 49 engages the peripheral edge of the shutter 28 so as to rotate the shutter in a selected direction. The parts are shown in neutral position in FIGURE 5 with wheels 48 and 49 being out of driving engagement with the periphery of shutter 28 which is preferably abrasively coated as indicated at 92.

In order to selectively engage either of the drive wheels 48 or 49 with the shutter 28, an operating arm 94 is provided and has an integral rigid lateral projection 96 (FIGURE 6) extending substantially at right angles thereto. As best shown in FIGURE 3, operating arm 94 is pivoted at its junction with the lateral projection 96 on a bracket 97 so as to rock on a vertical axis indicated at 100. Bracket 97 is integral with and projects laterally from the end plate 98 of fan housing 44. This arm 94 is biased to a central neutral position by a centering spring 101, the crossed ends of which engage opposed edges of a stationary tab 102 projecting upwardly from the bracket 97. Arm 94 is formed with a movable tab 103 which is bent back at right angles to the lateral projection 96 and projects upwardly through an aperture in bracket 97 in spaced alignment with tab 102 when the operating arm is in a neutral position as best shown in FIGURE 6.

By this construction, it will be appreciated that when the operating arm 94 is pivoted in either direction, the tab 103 displaces one end of spring 101 while the other end of spring 101 engages tab 102 which is stationary. This action biases the operating arm 94 to a neutral position where tab 103 aligns with tab 102.

Referring to FIGURE 2, the lateral projection 96 extends through a slot 104 formed in the upstanding dividing plate 12 and terminates below the socket assembly 16 in a manual operating lever 106. In its central neutral position, the lateral projection 96 rides on the upwardly facing edge of an upstanding plate 108 integrally with the wall 14 and extends upwardly beyond the lower edge of slot 104.

Displacement of the operating lever 106 to the left or right as viewed from FIGURE 1 shifts the lateral projection 96 until it rides off the top edge of plate 108 and is displaced downwardly by its resilient leaf spring bias to lock against one or the other of the side edges 110 of plate 108 in drive position.

Referring to FIGURES 5 and 6, the operating arm 94 projects through a slot 112 in plate 70 and is disposed between two coaxially opposed compression coil springs 114 and 116 which extend laterally across the slot 112. These springs 114 and 116 are provided with circular end plates 118 and 120 of slightly larger diameter than the vertical dimension of slot 112. The plates 118 and 120 are of the same construction being formed with diametrically opposed slots generally indicated at 121 (FIGURE 7) which engage the upper and lower edges of the slot 112 and facilitate abutment of the opposed end faces of plates 118 and 120 against lugs 122 and 124 which serve as guide retaining limits and project into the slot 112 from above and below the operating arm 94 in alignment with the arm 94 when the latter is disposed in its neutral position which is centrally located in slot 112.

The plates 118 and 120 each are provided with a centrally protruding hub portion 127 (FIGURE 7a) which axially extends into the coil springs 114 and 116 so as to pilot the springs in slot 112 when they are compressed by the operating arm 94.

In order to maintain the spring 116 in position in the slot 112, a guide retaining end plate 125 is provided and is biased by spring 116 against the left-hand edge of slot 112. This plate 125 is of the same construction as end plates 118 and 120. The spring 114 is seated at its end opposite the operating arm 94 in a retaining clamp 126 which is removably secured to plate 70 so as to maintain the spring 114 in position in the slot 112.

By this structure, it will be appreciated that when operating arm 94 is displaced to the right or left as viewed from FIGURE 5 by manipulation of the operating lever 106, the arm 94 engages and compresses either of the springs 114 or 116 depending upon the direction selected. The compression of either of the springs 114 or 116 swings plate 70 about its pivotal axis 72 so as to frictionally engage either of the wheels 48 or 49 with the periphery of shutter 28 to drive the latter in the direction selected.

The compression of spring 114 or spring 116 upon initial displacement of operating arm 94 in a selected direction is normally sufficient to engage wheel 48 or wheel 49 with shutter 28 and further displacement of arm 94 provides a resilient lost motion connection between the wheels 48 or 49 and shutter 28 for the purpose of assuring a resilient and firm frictional contact therebetween and to provide for a progressively increasing force for holding the wheels 48 or 49 in engagement with shutter 28. Thus when current is supplied to motor 37 to rotate shaft 41 both wheels 48 and 49 are driven in opposite directions as hereinbefore described. Consequently, when either wheel 48 or wheel 49 is biased into frictional engagement with the rim 92 of shutter 28, the shutter 28 will be driven in a selected direction. Rotation of shutter 28 drives shaft 52 to facilitate operation of the film drive mechanism and the film advancing claw as hereinbefore described.

Upon the release of the operating lever 106 from one of its locked drive positions to its neutral position, the compression springs 114 and 116 assist in resiliently urging the operating arm 94 to its neutral position wherein wheels 48 and 49 are out of engagement with the shutter rim 92. The abutment of the spring end plates 118 and 120 against lugs 122 and 124 prevents movement of the springs beyond this centrally neutral position when the compression of the springs are partially released by operating arm 94 and when the arm 94 is displaced in the opposite direction. When both drive wheels 48 and 49 are disengaged from shutter 28, it will be appreciated that the film drive mechanism and the film advancing claw also become inoperative and advancement of the film in either direction is stopped.

As best shown in FIGURE 5, a compression coil spring 128 has one end fitted in a socket cast in plate 12 and its opposite engaging a piloting projection 129 integrally framed on plate 70 so as to exert a light biasing pressure against plate 70 transversely of its pivotal axis 72. This spring 128 spring loads the plate 70 to insure movement thereof in response to actuation of the operating arm 94.

Referring now to FIGURES 2 and 8, adjacent the shutter 28 and disposed between the shutter and lamp 17, is a baffle plate 130 fixed to the plate 12 and having an aperture 132 aligned with the optical axis. A fire screen lever 134 having a perforated metal fire screen portion 136 is pivoted at 137 on the fan housing end plate 98 to facilitate arcuate movement of the fire shutter portion across the aperture 132 and out of the path of light along the optical axis.

In order to automatically operate the fire screen 136, an interlocking arm 138 is provided and has a bifurcated end 140 which engages with a pivot pin 142 affixed to the lever 134 near the pivoted end thereof. This interlocking arm 138 is pivoted at 144 on the fan housing end plate 98 at the junction of the arm and has an integral extension 146 which terminates in a downwardly facing bifurcated end 148 which straddles the operating arm 94 so that displacement of the latter causes the interlocking arm 138 to be swung about its pivot 144.

By this construction, it will be appreciated that the fire screen 136 is mechanically interlocked with the operating arm 94 which functions to establish a drive connection for rotating the shutter 28. When the operating arm 94 is in a neutral position and the shutter is not driven, the fire screen 136 is positioned in the path of the light source along the optical axis between the aperture 132 and the lamp 17. When the operating arm 94 is displaced to the left or right as viewed from FIGURE 5, by shifting the operating lever 106, the fire screen lever 134 is swung about its pivotal axis 137 so as to arcuately move the fire screen 136 above or below the path of light to the dotted line positions indicated in FIGURE 8 and to thereby expose the film advancing in the track assembly 26 to the full intensity of the illuminated lamp 17. The legs forming the bifurcated end 148 are spaced apart from the operating arm 94 by a predetermined distance when the arm 94 is in its centrally located neutral position as best shown in FIGURE 8. Thus, the initial displacement of the operating arm 94 does not serve to engage the arm 94 with the bifurcated end 148 to pivot interlocking arm 138 and fire screen 136. This initial displacement of the operating arm 94, however, does swing plate 70 about its pivotal axis 72, as hereinbefore described, so as to frictionally engage either of the wheels 48 or 49 with the shutter 28 to drive the latter in the direction selected.

Thus, it will be appreciated that because of the lost motion between the bifurcated end 148 and operating arm 94, the shutter 28 is set in rotation before the fire screen 136 is pivoted out of the path of light to a position above or below the optical axis of lens 21.

By this construction, the fire screen 136 is normally positioned above or below the optical axis of the objective lens 21 when the shutter is being rotated and when the film advancing mechanism is operatively connected to the motor 37 so as to keep the film in movement through the film track assembly 26. When the shutter 28 and, consequently, the film advancing mechanism is disconnected from the motor 37 by manipulation of the drive operating lever 106 to its neutral disengaging position, the film ceases to advance through the film track assembly 26 and the fire screen is pivoted to its neutral position in the path of light along the optical axis of lens 21.

It will be appreciated that the plurality of closely spaced perforations in the fire screen 136 functions to pass sufficient light in order to clearly project the picture from the film. By this construction, the film is shielded from the full force of the light source and, consequently, the heat emitted by the light source when the operating lever is returned to neutral position wherein the drive wheels 48 and 49 are disengaged from shutter 28 thereby disconnecting shutter 28 from motor 37. Thus, the film is held in one position by disengagement of the shutter 28 and, consequently, the film drive mechanism from motor 37. The film may be held in position for a substantial time period while each picture is being shown, without burning, blistering or otherwise damaging the film.

A centering spring 152, frictionally engaging pivot 137, biases the fire screen lever 134 into its neutral position in alignment with the optical axis and between lamp 17 and aperture 132. The crossed ends of spring 152 respectively engage a ledge portion 154 formed integral with lever 134 and the edge of a forwardly bent tab 155 in end plate 98.

FIGURES 9 and 10 show a cover 156 for the drive mechanism side and a cover 158 for the film handling side. Cover 156 is removably mounted on the base 11 by two screws indicated at 159 which extend upwardly through apertures formed in the base 11 and by a screw 160 which extends through the plate 12 and threadedly engages a bracket 162 projecting inwardly from the side wall 164 of cover 156 and affixed thereto by any suitable means such as screw 166. During normal operation and usage of the projector, the cover 156 may be held in position on the base 11 only by screw 160 to thereby facilitate the ready removal of the cover to provide access to the drive mechanism side.

The cover 158 is of the same size and shape as cover 156 and is normally removably held in place by a spring latching mechanism 168 (FIGURE 10a) which is mounted on the upper edge of plate 12 so as to be readily operated from the top of the projector to facilitate the removal of the cover. This cover 158 is provided with two spaced lugs generally indicated at 170 projecting downwardly from ledges extending inwardly from the cover side wall 172. These lugs 170 extend through suitable apertures in the base 11 with a piloting fit.

Referring to FIGURE 10a, the latch mechanism 168 comprises a latch tongue 176 affixed to the cover 158 so as to extend through an aperture 178 formed in plate 12 and through an aperture in the latch slider 180. The latch slider 180 is slidably mounted transversely of the tongue 176 on screws 182 and 184 secured in plate 12 and is biased upwardly as viewed from FIGURE 10a by a leaf spring 186 affixed to plate 12 by screw 182.

In assembled relation, the latch slider 180 is biased into engagement with the latch tongue 176 in a notch 188 so as to prevent movement of the cover 158 and removal thereof.

In order to remove the cover 158, a slide plate 190 is shiftable along the upper edge of plate 12 and is affixed to a lateral projection of latch slider 180 which extends upwardly through an enlarged slot formed in plate 12. Thus when the slide plate 190 is shifted to the left along the upper edge of plate 12 as viewed from FIGURE 9, the latch tongue 176 is released from engagement with slider 180 and the cover 158 can be tilted outwardly and removed.

Supply spindle 58 is journalled in the upper end of a hollow arm 200 that is pivoted on the same side of plate 12 as the film track assembly 26 to rock about an axis of a stub shaft 202 (FIGURE 1). In operation of the projector, the arm 200 is swung about its stub shaft axis 202 to a position shown in dotted lines and indicated at 204. When it is desired to place cover 158 in position on the base 11, the arm 200 is pivoted into its horizontal position as best shown in FIGURE 2. In this position, the arm 200 overlies the lamp housing 31 between the top thereof and the top of cover 158 in spaced parallel relation to plate 12. It will be appreciated that this construction provides for a compact arrangement of the spindle 58 and arm 200 to facilitate the mounting of the cover 158 and eliminates the necessity of providing the cover 158 with bulky projections for enclosing the arm 200 in its erected position.

When the cover 158 is removed to set the projector up for operation, the arm is readily erected by simply pivoting it about its shaft axis 202.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of eqiuvalency of the claims are therefore intended to be embraced therein.

What is claimed and desired to be secured by United States Letters Patent is:

1. In a motion picture projector, a motor, a rotatably mounted shutter and means for driving said shutter in a forward or reverse direction comprising a pivotally mounted support, a pair of friction wheels rotatably mounted on said support resiliently biased into peripheral driving contact with each other and adapted upon selective movement of said support to selectively engage the periphery of said shutter, drive means for operatively connecting one of said wheels with said motor to drive said wheels in opposed directions and selector means for providing a resilient connection with said support so as to pivot said support in a selected direction to thereby swing one of said wheels into engagement with said shutter with a progressively increasing force to thereby drive said shutter in the direction selected and means normally biasing said selector means to a neutral position wherein both of said wheels are out of driving engagement with said shutter.

2. In a motion picture projector, a rigid support comprising a base and a centrally disposed upstanding film handling and drive mechanism support plate integral with said base, said plate having a ventilation grating, an integrally formed lamp house projecting from one side of said plate and a through opening in said plate communicating with the interior of said lamp house; an electric motor mounted on the other side of said plate and having a shaft substantially parallel to the vertical plane of said plate; a first fan mounted on said shaft near said grating for drawing air from the one side of said plate; a second fan mounted on said shaft, and a shroud surrounding said second fan with its outlet connected to said opening for delivering cooling air therethrough directly into said lamp house.

3. The projector as defined in claim 2 wherein said plate is provided with an integral tubular lens mount projecting from the one side of said plate, and an objective lens mounted in said lens mount so that its optical axis is in substantially spaced parallel relationship to the vertical plane of said plate.

4. The projector as defined in claim 3 wherein rotatable film sprockets are mounted on the plate above and below the lens mount, and arcuate film guide shoes are provided integral with said plate and projecting from the one side thereof above the upper sprocket and below the lower sprocket respectively.

References Cited in the file of this patent

UNITED STATES PATENTS

| | | |
|---|---|---|
| 1,802,045 | Bogopolsky | Apr. 21, 1931 |
| 1,819,047 | Thornton | Aug. 18, 1931 |
| 1,982,739 | Kaden et al. | Dec. 4, 1934 |
| 2,031,832 | Holden | Feb. 25, 1936 |
| 2,120,005 | Scott | June 7, 1938 |
| 2,190,658 | Githens et al. | Feb. 20, 1940 |
| 2,196,738 | Nagel | Apr. 9, 1940 |
| 2,817,267 | Halahan et al. | Dec. 24, 1957 |
| 2,907,532 | Briskin et al. | Oct. 6, 1959 |